United States Patent
Wagner

(10) Patent No.: US 11,293,406 B2
(45) Date of Patent: Apr. 5, 2022

(54) ARRANGEMENT OF TOWER STRUCTURES BRACED BY TENDONS

(71) Applicant: Philipp Wagner, Heustreu (DE)

(72) Inventor: Philipp Wagner, Heustreu (DE)

(*) Notice: Subject to any disclaimer, the term of this patent is extended or adjusted under 35 U.S.C. 154(b) by 107 days.

(21) Appl. No.: 16/627,231

(22) PCT Filed: Jun. 25, 2018

(86) PCT No.: PCT/EP2018/000317
§ 371 (c)(1),
(2) Date: Dec. 27, 2019

(87) PCT Pub. No.: WO2019/001765
PCT Pub. Date: Jan. 3, 2019

(65) Prior Publication Data
US 2020/0124029 A1 Apr. 23, 2020

(30) Foreign Application Priority Data
Jun. 27, 2017 (DE) ...................... 10 2017 006 058.4

(51) Int. Cl.
| | | |
|---|---|---|
| *F03D 13/20* | (2016.01) | |
| *F03D 9/25* | (2016.01) | |
| *F03D 1/02* | (2006.01) | |
| *F03D 17/00* | (2016.01) | |
| *E04H 12/20* | (2006.01) | |

(52) U.S. Cl.
CPC ............. *F03D 13/20* (2016.05); *E04H 12/20* (2013.01); *F03D 1/02* (2013.01); *F03D 9/257* (2017.02); *F03D 17/00* (2016.05); *F05B 2240/96* (2013.01)

(58) Field of Classification Search
CPC . F03D 9/257; F03D 1/02; F03D 13/20; F03D 17/00; E04H 12/20; F05B 2240/96
See application file for complete search history.

(56) References Cited

U.S. PATENT DOCUMENTS

| | | | |
|---|---|---|---|
| 5,146,096 A | 9/1992 | McConachy | ................... 290/44 |
| 8,823,198 B2 | 9/2014 | De Boer | ................... F03D 9/00 |
| 9,013,053 B2 * | 4/2015 | Lee | .......................... F03D 13/20 |
| | | | 290/55 |

(Continued)

FOREIGN PATENT DOCUMENTS

| | | | | |
|---|---|---|---|---|
| CN | 102362068 | | 2/2012 | ............... F03D 1/00 |
| CN | 105531474 | | 4/2016 | ............. F03D 17/00 |

(Continued)

OTHER PUBLICATIONS

International Preliminary Report on Patentability issued in application No. PCT/EP2018/000317, dated Dec. 31, 2019 (14 pgs).

(Continued)

*Primary Examiner* — Andrew J Triggs
(74) *Attorney, Agent, or Firm* — Hayes Soloway P.C.

(57) ABSTRACT

According to the invention, the control system consists of one or more global controllers configured to receive state data from the tower structures and tendons, via sensors and control an operating state of the wind generators correspondingly in a calculation method for avoiding load peaks and/or avoiding resonances. In a preferred embodiment, a local controller is configured to also process status data of the sensors from a near field of a building around the respective local controller.

20 Claims, 5 Drawing Sheets

(56) References Cited

U.S. PATENT DOCUMENTS

Figure 1A:
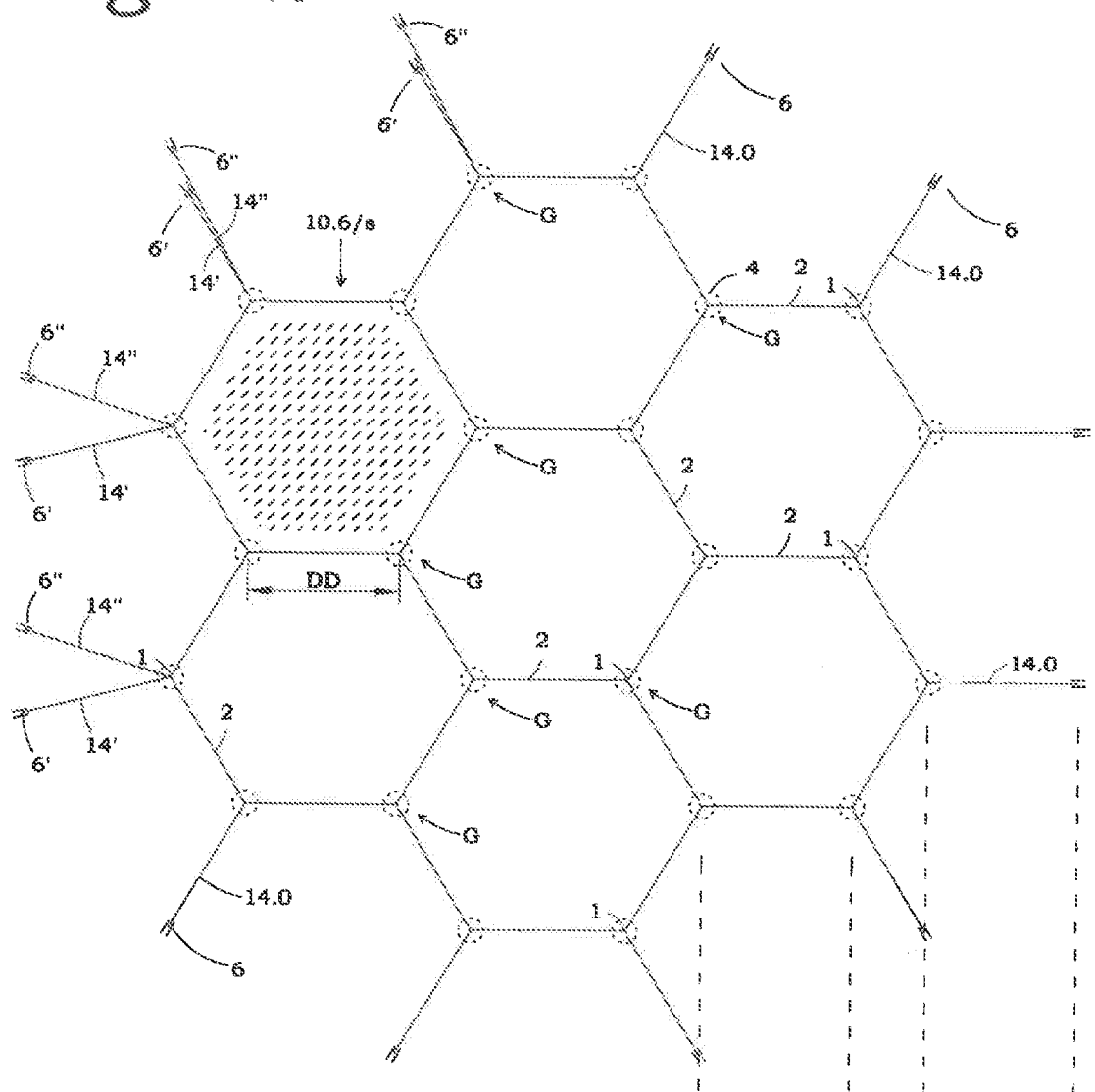

| | | | |
|---|---|---|---|
| 9,909,557 B2 | 3/2018 | Christiansen | F03D 1/00 |
| 10,138,866 B2* | 11/2018 | Ohya | H02K 7/1838 |
| 10,428,789 B2* | 10/2019 | Baun | F03D 1/02 |
| 10,502,189 B2* | 12/2019 | Baun | F03D 13/20 |
| 10,570,880 B2* | 2/2020 | Baun | F03D 7/0224 |
| 10,626,850 B2* | 4/2020 | Neubauer | F03D 13/20 |
| 10,690,116 B2* | 6/2020 | Grunnet | F03D 7/0296 |
| 10,697,436 B2* | 6/2020 | Baun | E04H 12/24 |
| 10,753,338 B2* | 8/2020 | Miranda | F03D 7/047 |
| 10,808,682 B2* | 10/2020 | Miranda | F03D 7/026 |
| 10,914,283 B2* | 2/2021 | Trankjær | F03D 1/02 |
| 10,934,999 B2* | 3/2021 | Baun | F03D 1/02 |
| 10,968,893 B2* | 4/2021 | Jensen | F03D 1/02 |
| 10,982,650 B2* | 4/2021 | Grunnet | F03D 7/0224 |
| 2001/0002757 A1* | 6/2001 | Honda | F03D 13/25 290/55 |
| 2014/0103665 A1 | 4/2014 | Von Grunberg et al. | F03D 11/04 |
| 2015/0308139 A1 | 10/2015 | Wagner | E04H 12/20 |
| 2017/0241408 A1 | 8/2017 | Von Heland | F03D 13/25 |
| 2018/0023543 A1* | 1/2018 | Kudsk | F16H 7/02 416/9 |
| 2018/0023544 A1* | 1/2018 | Baun | F03D 13/20 416/9 |
| 2018/0363622 A1* | 12/2018 | Baun | F03D 1/02 |
| 2020/0124029 A1* | 4/2020 | Wagner | E04H 12/20 |
| 2020/0318612 A1* | 10/2020 | Miranda | F03D 7/0272 |
| 2020/0318613 A1* | 10/2020 | Sorensen | F03D 7/042 |
| 2020/0408195 A1* | 12/2020 | Jensen | F03D 13/20 |

FOREIGN PATENT DOCUMENTS

| | | | |
|---|---|---|---|
| CN | 106536923 | 3/2017 | F03D 13/25 |
| DE | 202016008087 | 3/2017 | F03B 13/10 |
| GB | 2425328 | 10/2006 | F16B 2/06 |

OTHER PUBLICATIONS

International Search Report and Written Opinion issued in application No. PCT/EP2018/000317, dated Oct. 15, 2018 (17 pgs).

* cited by examiner

ARRANGEMENT OF TOWER STRUCTURES BRACED BY TENDONS

Generators driven by wind blades, also known as wind generators, which are attached to a mast in groups of several, have been proposed variously in the past and also tested at smaller and medium scales. There are basically two main types of construction: On the one hand, there are vertically clamped cantilever girders which branch off in a tree-like or star-shaped manner to accommodate several rotors at the end points of the "branches". On the other hand, there are strut structures in which rotors are mounted one above the other on a single mast. Flexible and articulated masts were also proposed. Occasionally mixed forms have been proposed.

It has also been suggested that, in particular, tower structures with several rotors should be arranged both side by side and one behind the other in order to harvest larger amounts of energy from the flowing wind. Also, stacked plants and plants with vertical-axis rotors were proposed in order to harvest the energy not in the even area, but in the vertical. Due to the size of these plants, some of which are several hundred meters high, experts believe that such a construction method is not economical either for construction or in operation. Due to extreme bending moments in the tower structure due to the loads of several wind generators, such a structure would be uneconomical in its dimensions. In their argumentation it is obvious, that in comparison to wind generators arranged side by side no significant advantage can be obtained, since such plants are afflicted in particular due to the height of the tower with structural problems, which one cannot answer cost-efficiently. According to experts, it is always preferable to have a wind farm flat on the ground rather than such a vertical solution.

DE202016008087U1 proposes an arrangement of wind or hydro power plants in clusters, arrays or flotillas—the terms are used synonymously in the publication. Especially with regard to a better utilization of hydropower plants through optimized anchoring systems, the publication makes general statements based on previously cited, older patent literature and proposes an arrangement of generator units through connections in so-called minimal grids. The publication remains very general in its statements and does not offer an approach for a real implementation of joint power-generation units that can be built and operated more cost-efficient than conventional wind or hydro power plants, which are set up independently of each other and thus form a conventional addition of power generation units. Rather, as with all previous proposals, the expert gains again the impression that considerable additional effort is required for the construction and operation of additional connecting load-bearing structures between the power generation units, about whose size and complexity the author makes no statement, which in no way can be economic.

It is similar to all proposals made so far that due to the very large forces that occur, especially in multi-megawatt generating units, corresponding supporting structures have to be very large, which makes them uneconomical.

This invention shows how the construction and operation of large-format wind farms in three-dimensional clusters and arrays can be carried out in an innovative, efficient and optimized way by integrating structure and operation.

With its main feature, the invention describes compact stacked construction methods that exceed the area-intensity of the energy yield, i.e. the harvested energy per area, many times over compared to conventional wind farms.

The invention describes safety mechanisms with a further feature in order to protect the susceptibility of the very slim supporting structures against failure and total failure, in particular through possible 'domino effects'.

The Invention describes with a further feature methods for the control of the wind generators to avoid load peaks in the supporting structure in order to keep the dimensioning of the supporting components slim and efficient despite the large overall dimensions of the stacked construction by dedicated reduction of load peaks and the avoidance of propagating resonances.

From an aerodynamic point of view, favorable distances between the towers of wind generators are usually given as 5 to 6 times the rotor diameter in order to keep the slipstream caused by wake-effects from neighboring wind generators to a minimum. This recommended, economically favorable, distance as a multiple of the rotor diameter in the horizontal direction and the resulting necessary height of the tower in the vertical direction, determined by the aforesaid rotor diameter, and the resulting length of the required tension members between the towers, results in an economic optimum for multi-storey guyed towers with several wind generators on top of each other, if the design is carried out as described in the invention. This optimum remains valid even if the distance between the adjacent towers—usually indicated in multiples of the rotor diameter of the wind generator—increases by a factor of 1.5 or decreases by half.

With its main feature, the invention proposes in particular multi-storey configurations in which exactly three generators are preferably arranged one above the other on a tower. In this way, the energy of the wind can be harvested three times on a given area and at the same time a particularly efficient structural optimum can be achieved and used for the very high tower structure, that is described below.

In order to keep a tower structure, to which several, preferably three, wind generators are attached one above the other, in position, the invention proposes a tower in the form of a rod, which is additionally guyed between the generator at the top of the tower and the generator below. The fixation is done by tendons. In contrast to the U.S. Pat. No. 5,146,096A in particular, the tower is not composed of articulated sections, but is stiff in order to achieve the desired effects of very small deflections, as described below.

In accordance with the invention, the tendons, which are fastened to the tower between the uppermost and second uppermost wind generator and continue from the respective tower, lead into the respective base-area of the neighboring tower, which makes expensive and costly foundations for tensioning, like with conventional guyed wind power towers, superfluous. The towers are arranged to each other in such a way that the lower end of the tendons of a tower leads into the base point of a neighbouring tower and only at the outer edges of the wind farm additional anchoring points are required. Since tendons and tendon foundations are generally very expensive components, the invention suggests that each tower should only be anchored at one height. This happens in particular between the uppermost and second uppermost wind generator of a tower. The tendons lead exactly into the base-area of the neighboring tower. Further tensioning with tendons in several heights of the tower structure is preferably avoided in the sense of the invention.

The diagonally orientated tendons between the towers are applied in both directions, so that viewed from the side a reciprocal "cross guying" is created.

According to the invention, the tendons are dual-routed for safety reasons. In addition to the tendons, the Invention also provides for horizontal tensioning, which offers additional, redundant protection against the failure of the diagonal tendons. This additional horizontal guying preferably extends between the towers in the area of the upper guying points of the tower. These horizontal guyings unfold their advantageous effect when several of the diagonal tendons may fail at the same time. Due to the presence of horizontal guying, the failure of the diagonal tendons does not lead to a "domino effect" in which neighboring towers including the wind generators attached to them could become unstable due to the unilateral loss of tensile force on the towers, where first a tower falls over and then others follow. These safety tendons are proposed in particular in order to provide considerably better protection for the serviceability of the installations against structural failure or total failure (domino effect). Improving the serviceability of the wind farms makes it easier to insure them against damage to the towers and possible failure of the towers. In top-view the tendons and the safety tendons are preferably fixed tangentially in the area of the walls of the towers in order to guarantee the most favorable load transfer of the tensile forces of the tendons to the shell of the tower.

In a variation of the invention, the tendons are attached to an annular widening of the cross-section of the tower, e.g. to a platform.

An annular widening of the cross-section of the tower allows the incoming forces of the tendons to be uniformly applied to the shell of the tower.

In a variation of the invention, the tendons and/or the safety tendons are looped around the tower.

In a variation of the invention, viewed from top, the tendons and/or the safety tendons are fastened centrally in front of the tower and the load is distributed by load distribution elements, e.g. platforms or cross-sectional widenings of the tower wall.

The positioning of the towers and the crossed diagonal tendons in the side view between the towers saves a large number of guying-foundations, which already noticeably increases the economic efficiency of such a configuration. In the illustrations, FIG. 1 shows a schematic example of an arrangement with twenty-four towers and only twelve external guyed foundations instead of the otherwise seventy-two necessary guyed foundations. By stacking the generators on top of each other, the ratio is further improved, as 216 guyed foundations would be necessary in the case of individual guyed wind generators.

The invention proposes the operation of preferably three wind generators on one tower. It envisages attaching the inclined tendons to the tower only between the penultimate and last level of wind generators counted from the ground. The invention shows that the arrangement of the tendons attached to the tower between the two uppermost wind generators under wind-load result to bending moments in the tower structure that accumulate at the guying-point and neutralize each other due to the counter-reaction of the tendons. The summarizing of the inverse bending moments near the guying point turns out into very small deflection of the tower structure from the vertical despite the large overall height. The deformation of the tower in the first Eigenform corresponds to a weak S-curve due to the arrangement of the anchoring point between the wind generator at the top of the tower and the wind generator below plus the load input of all three wind generators into the same tower. In this respect, the entire tower can be very slim. Additional tensioning between the first and second wind generators is not necessary, which results in considerable cost savings. The arrangement reduces the number of necessary tendons on the tower structure. At best, despite the considerable overall height, only a single guying level is required. As described, this guying level is preferably located between the wind generator at the top of the tower and the wind generator one step below.

Figuratively speaking, the invention aims for the two upper wind generators, the intermediate point of tension and the reaction of the tower behaving similar like two weighing pans, whose weights are balanced by the central point of the balance beam of a balance keeping the balance because of approximately the same loads.

The invention also aims to ensure that the effect of the upper two thirds of the tower onto the lower third of the tower section, together with the wind generator arranged on the ground side, is such that a quasi-fixed bearing consisting of the upper tower section is arranged above the wind generator positioned on the ground side. This effect gives the lower section of the tower additional stability. The effect also reduces the bending moment in the lower section of the tower and the variable loads and bending moment acting on the base of the tower and the tower foundation below, which either extends the life of the tower or makes the tower-base and foundation leaner.

According to the invention, the lower part of the tower structure is preferably designed as a reinforced concrete structure. Preferably the reinforced concrete construction is a prestressed concrete construction. The advantageous effect of such a structure, which is usually more than 300 meters high, is its bending stiffness and its necessary torsional stiffness.

The tower structure in the upper area is preferably constructed as a tubular steel tower in steel construction. Preferably, the transition from reinforced concrete construction to steel construction takes place in the area of the upper guying point, ideally just above it. The construction of light steel tube segments in the upper tower area reduces the overall weight and improves the frequency behavior of the tower.

According to the invention, in the case of offshore applications, a foundation structure attached to the lower end of the tower can preferably be a composite reinforced concrete structure. This is cheaper than GBFs (=gravity based foundations) and stiffer than a pure steel monopiles. Preferably, the steel tube of the composite is first brought to the installation position. Not until the installation position the steel tube is filled with concrete in the designated sections to achieve the desired stiffness. The sections of the steel tube intended for the composite compound do not have to represent the entire length of the steel tube.

In order to ensure smooth operation of the three wind generators, al wind generators are mounted along the tower in such a way that they can be rotated individually and aligned to the wind. According to the invention, the broken wind generator can be turned and controlled separately from the other wind generators during maintenance.

In accordance with the invention, the wind generators are connected along the tower with a jig that is rotatable mounted around the tower shaft of the tower. The rotating bearing of the device is preferably a plain bearing.

The structural part of the invention described in the first section of the invention is supplemented by a procedure for regulating the space wind farm, which, according to the invention, is implemented in particular by the installation of "global controllers". A controller is usually a control unit that controls a wind generator. It calculates the optimum operating condition from rotor speed, pitch angle of the rotor blades, orientation to wind direction, wind speed and other parameters. Usually each controller controls one wind generator. In connection with the invention, "global controllers" are used, which do not only control and regulate individual generators, but also control the entire space wind farm as a coherent structure or parts of it via the invention-based control method.

According to the invention, the Global Controllers are not only designed to improve the park efficiency of a single level of wind generators or of all levels. It is part of the invention to execute and program the control procedure of the global controller in such a way that this control procedure controls the individual wind generators in a different way to maximize the park efficiency from the collected data on the measured wind, the plant condition and the filed park structure. This can be done, for example, with wind generators, first hit by the wind, that only partially withdraw the energy from the wind through their blade position and wind generators standing in the second and third rows in the wind direction withdrawing the remaining energy from the wind. This control method is particularly advantageous during extremely strong winds and storms, so that the entire park does not have to be switched off as usual during this extreme weather-condition, but remains "more permeable" to the flowing wind when it hits the foremost wind generators.

The global controller also takes into account and monitors the tensegrity network-system of the space wind farm from its interconnected components, i.e. the tower and the tendons with the embedded wind generators, taking into account their inherent interaction. Inherent interactions are, for example, the oscillation of the tower as a result of operating loads and the resulting tightening and oscillation of the tendons. By adjusting the operating loads using the control procedure of the global controller, e.g. in accordance with a previously programmed optimum, unwanted vibrations in the tendons and the towers and the wind generators attached to them can be avoided, damped or specifically reduced and thus load peaks in the tendons and the tower structures and the wind generators can be significantly reduced over the lifetime. Excessive lateral loads, e.g. due to storms, can be avoided by adjusting the operating conditions of the wind generators, e.g. by partial load operation.

According to the invention, the interaction of the interconnected load-bearing components is influenced by the control method of the global controller in such a way that load peaks in the load-bearing components and the components of the wind generators occur less frequently and early material fatigue of the load-bearing structure and the wind generators is prevented. According to the invention, the adjacent rotors of the wind generators on a tower structure run in opposite directions. According to the invention, the rotors of the wind generators of the adjacent tower structure run in opposite directions on one level.

According to the invention, measuring points, in particular also state sensors such as acceleration- and tension-sensors, are used to transmit their recorded values to the global controller. By processing the input values of the measuring points, which collect and forward the condition data of the entire structure, consisting of the operating data of the wind generators and the condition data of the supporting structure of the entire space wind farm, transferring them to the global controller, the output of corresponding positioning information is calculated, which generates several advantages: The wind generators are not only controlled like a loose group of individual turbines by individual controllers, as in a conventional wind farm. Rather, the global controller monitors the overall spatial structure on two different levels. Multi-layer monitoring particularly takes into account the nature of this type of arrangement and the nature of this particular load-bearing structure:

On the one hand, the Global Controller monitors the spatial arrangement of wind generators from a thermodynamic point of view. The optimal efficiency of the wind field is calculated with the wind generators. The control procedure of the global controller takes into account in particular those thermodynamic effects which are characteristic for a three-dimensional wind field. This is, for example, the specific recombination of the energy of the wind behind the rotors. This effect is different for the wind generators at the top of the tower structures from the central wind generators and the lower wind generators.

In addition, the condition of the entire spatial structure, i.e. the supporting structure, plays a new role. Here, the tensegrity structure is of particular importance, which is influenced by the control method of the global controller for the overall structure.

Tensegrity structures consist of pressured rods and tensioned members. In such structures the transmission and distribution of forces and especially of vibrations is an essential characteristic. It is a very special quality of such a structure. Wind generators are components that induce very strong vibrations and release them into the tensegrity structure. Therefore, loads and vibrations of wind generators in the tensegrity network no longer act only on a single tower structure or tendon, but are passed on. Loads add up and oscillations swing up without active intervention. This inevitably leads to larger component dimensions. It would cancel out the desired advantages of an efficient structure. It is therefore the task of the control method of the global controller in particular to avoid load peaks due to the transfer of loads within the supporting structure, as well as the incrementation of vibrations and their transfer within the supporting structure. It is the task in particular of the control method of the global controller to bring about an active damping by, for example, giving corresponding control signals to individual or several or all wind generators in order to adapt their operating states. The reduction of load peaks through adapted operating conditions and/or additional actively addressed damping elements as a result of the control procedure of the global controller reduces the load as well as the fatigue load on load-bearing components, so that these can be dimensioned slimmer and more efficiently.

It is the object of the control procedure of the global controller to favorably influence the reduction of loads, load peaks and fatigue stresses within the space wind farm by the targeted control of wind generators, in particular their natural frequency behavior, caused by the different operating conditions of the wind generators: The macroscopic structures of the space wind farm are subject to numerous vibration excitations both by the wind generator induced frequencies p and 3p of the rotors, and by the components themselves, e.g. excitations due to the natural frequency of the tower or the galloping of the tendons, or the vibration of the tendons by wind excitation. The invention provides the global controller with data on the condition of both the load-bearing components and the rotor blades, as well as the speeds of the rotors of the wind generators, in particular via acceleration sensors. The Global Controller is programmed in accordance with the invention in such a way that control commands are issued to the wind generators in a process in which the speed and power to be set keeps the load peaks and resonances within the space wind farm low or completely avoids them. This can be achieved, for example, by a selected uneven distribution of the rotor speeds of all wind generators. This can be done by chaotic or quasi-chaotic control of the wind generator speeds by the global controller. This can also be done by active damping elements on moving or stationary components. These damping elements can be addressed by the control method of the global controller. These active damping measures can additionally be supported by structural measures with passive damping effect and by passive damping elements.

According to the invention, the global controller can also have controller subunits that are not or only partially networked with each other and can be subject to a hierarchical or networked structure. According to the invention, the control of a space wind farm is preferably a multi-stage control method. According to the Invention, the control system consists of a global controller or several global controllers and local controllers. In this way, the entire computing power required for a large number of wind generators is transferred by means of a kind of parallel computing architecture from one or more global controllers to local controllers, each responsible for a single wind generator or a small group of wind generators. The local controllers take over parts of the control.

According to the invention, each wind generator can also have a partially or completely independent controller unit, which can take over the control of the respective wind generator in particular if the higher-level controller unit(s) fall or are switched off or do not give any control impulses over longer periods of time in regular operation. In this way, safe operation or continued operation of the wind generators is guaranteed, even if the higher-level controller unit(s) are not in operation or standby. This also serves for redundant safety.

According to the invention, individual wind generators mounted on top of each other can be switched off for maintenance and repair purposes. Lifting tools can be fixed and operated in the area of each wind generator.

According to the invention, the tendons are doubled in each direction in order to increase reliability. They are also equipped with connecting elements at the crossing points in order to reduce the vibration sensitivity of the tendons by shortening the vibrating component length of the tendons. The tendons can also be equipped with passive or active vibration dampers.

According to the invention, additional connecting elements can be fitted between the tendons or between the tendons and the tower or between the tendons and the ground at further points along the length of the tendons in order to further reduce the free length of the vibrating tendon. The attachment of further connecting elements suppresses possible oscillations or galloping of the tendons and improves the dissipative and passive damping of oscillations in the tendons.

According to the invention, damping elements mounted between the wind generators and the tower structures can additionally reduce possible load peaks and vibration excitations between the towers and the generators. These damping elements can, for example be constructive add-ons in the connecting elements between the wind generators and the tower. These can, for example allow relative movements in the form of slides or swings.

According to the invention, the tendons between the tower structures can additionally be equipped with securing means, e.g. loose safety lines, in order to be held in place in the event of a failure and not to fall into the rotating components of the wind generators or to damage other components by rebounding and impact.

According to the invention, the tower can consist in parts or completely of concrete. The tower is preferably constructed using slipforming-technology. The tower can have different diameters at different heights. The tower can have different wall thicknesses at different heights. The tower can be made of different types of concrete at different heights. The tower can have different degrees of prestressing at different heights due to tensioning elements installed in the tower. The tower can be reinforced differently at different heights. These measures can be used individually or in any combination, in particular for structural vibration damping. The tower can be equipped with measuring probes at different heights to monitor the condition of the structure. These measuring probes can be embedded in the concrete cross-section.

In the case of an offshore space wind farm, the overall configuration of the supporting structure with very high, heavy and tilt resistant tower structures has the advantage that only inexpensive monopiles are required for erecting the tower structures on the seabed. Monopiles are only used in conventional offshore wind turbines up to medium water depths. Larger bending moments and stronger wave power in greater water depths cannot be realized economically with monopiles. Through the ingenious combination of heavy tower structures with high normal forces and intermediate tensions, the use of inexpensive monopiles is also possible at greater water depths, because the invention reduces the bending moment of the tower structures to very low values even under load.

According to the invention, the tendons, which in top view lead away from the center of the wind farm, situated at the edge of the wind farm directed to the outside anchoring the wind farm to the side, can run in diverging directions. In offshore wind farms in particular, this ensures that in the event of a collision with a ship or flotsam, the failure of the outermost tendon, which leads through the water surface to the seabed, does not lead to the failure of the entire support structure due to the failure of the necessary tensile force at one point.

In accordance with the invention, all the above measures can be freely combined.

Figure 1B:
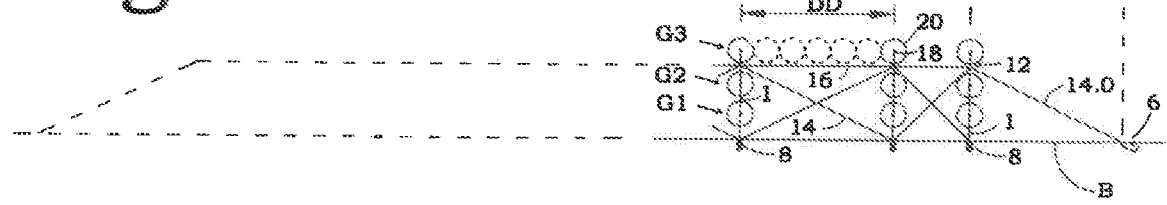

Further features and advantages of the invention result from the following description of the preferred design forms with reference to the drawings. In these there are shown:

FIG. 1a shows a wind farm according to the invention or a space wind farm schematically in top view and FIG. 1b shows the wind farm schematically in a side view. 1 symbolically shows a tower within the space wind farm, 2 symbolically shows the direction of the tendons 14 running crosswise and the safety tendons 16 shown in the FIGS. 1b, 5, 6 and 7 between the towers 1. The circle 4 describes the maximum reach of the blade tips in all directions by the rotor tips of the wind generators G in top view qualitatively. $10.6/s$ describes a symmetrical hexagonal cell within the space wind farm shown here. The towers are positioned at least at the recommended distance of 6 rotor diameters DD (see also FIG. 1b). In the shown cell $10.6/s$ a total of eighteen generators is preferably operated. The yield triples compared to a conventional wind farm with only one level and six wind generators extending flat over the area. According to the invention, this schematic example already shows that the efficiency of such arrangements is far superior to conventional wind farms. The output per area is tripled. Only twelve external guyed foundations and twenty-four tower structures are required to operate a total of seventy-two wind generators on a small area with correspondingly small leases and smaller infrastructure measures necessary for the operation of a wind farm.

As the tendons 14.0 positioned on the edge, which lead into the guy foundation 6, are designed only as single, preferably double-stranded tendons, and there are no further safety tendons 16 on the edge, like shown between the towers 1, as shown in FIG. 1b, the guy foundation 6 can be divided into two adjacent guy foundations 6' and 6". This division ensures that in the event of the failure of one of the two tendons 14' and 14", which are preferably double-stranded, leading outwards, the overall structure does not fail. In the case of an offshore construction, the subsoil B can also be the seabed.

FIG. 1b shows a schematic section of the multi-storey wind farm from the side. The wind generators G1 to G3 are arranged on top of each other at the tower 1. The towers 1 are preferably located at a distance DD of five to six rotor diameters 20. The cross 18 in the middle of the rotor circle 20 symbolizes the position of the generator. The multi-storey space wind farm is crosswise guyed by 14 tendons. It rests on foundations 8 and is anchored at its outer edges to the side by tensioning foundations 6 in the subsoil B. The wind park is a multi-storey wind farm. In the case of offshore construction methods, the foundations 8 can also be an offshore foundation structure. The securing tendons 16 describe horizontal tendons which, in comparison with the diagonal tendons 14, preferably have a lower load-bearing capacity and are primarily used for the safety of the entire wind farm. They take over part of the load-bearing capacity of the diagonal tendons 14 in the event that they fall and prevent lateral tip over of tower 1, which is affected by the failure of the diagonal tendon 14.

Figure 2:
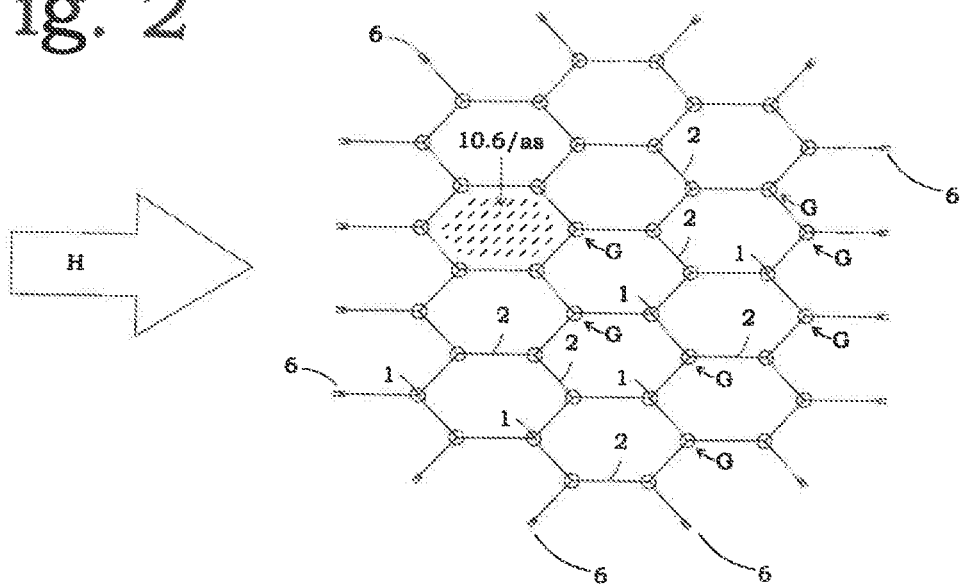
Figure 3:
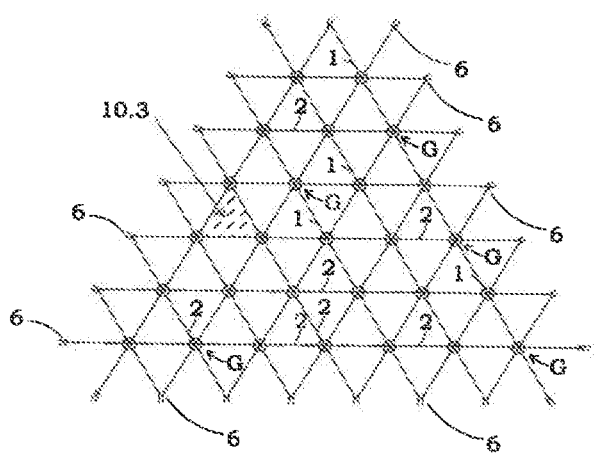
Figure 4:
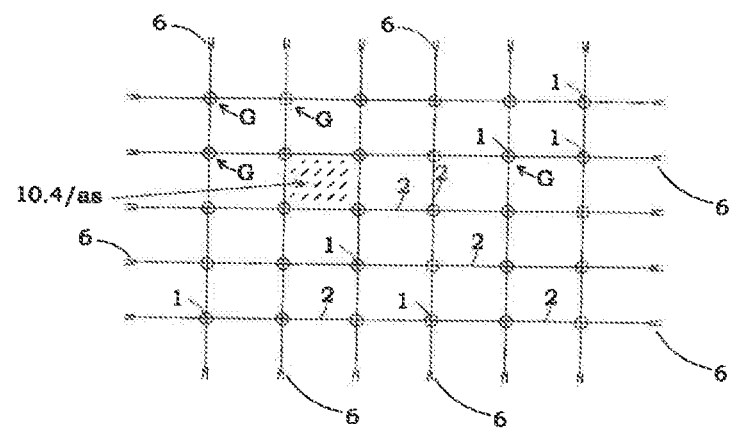

FIGS. 2 to 4 show schematically different possible arrangements of towers 1 and the direction 2 of the tendons 14 and safety tendons 16 arranged between towers 1, with FIG. 2 showing a hexagonal arrangement aligned to a main wind direction H. The diagonal tendons 14 and safety tendons 16 are arranged in the same way as the diagonal tendons 14. Cell 10.6/as is accordingly asymmetrical. FIG. 3 shows a wind field in which the direction 2 of the tendons 14 and the safety tendons 16 lead away from the towers 1 in six directions. Cells 10.3 are created which have a triangular structure in the top view due to the direction 2 of all tendons. This arrangement additionally increases the redundancy against the failure of tendons. FIG. 4 schematically shows the same principle for a rectangular arrangement of the tendons.

Figure 5A:
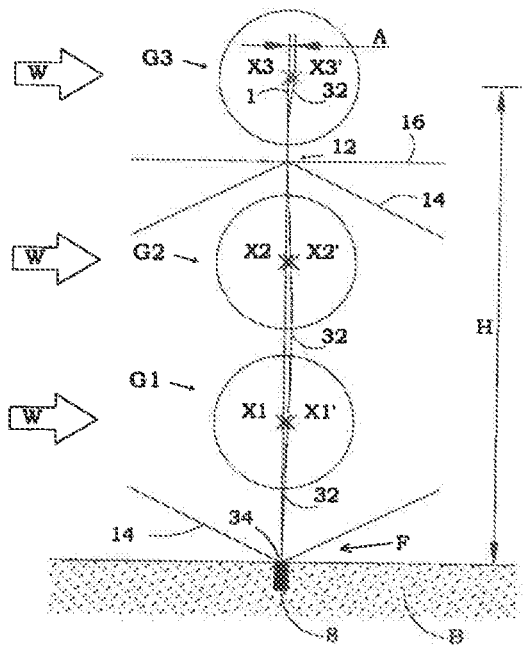
Figure 5B:
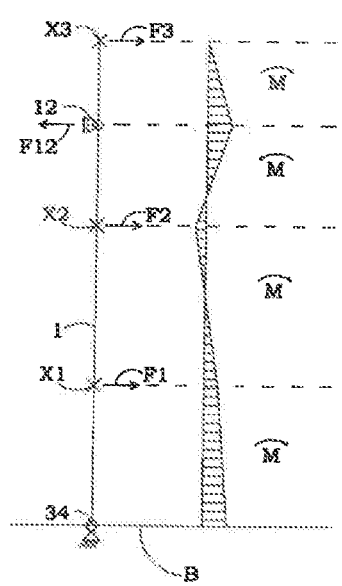
Figure 5C:
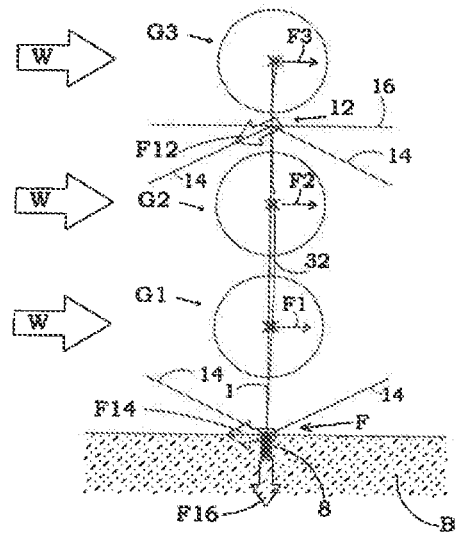

FIGS. 5a and 5b show the principle of the invention from close up using the example of a single tower structure 1: The guying 12 at tower 1 by means of the tendons 14 takes place between the two upper wind generators G2 and G3. A guying above the lower wind generator G1 is not necessary according to the invention. The dotted line 32 qualitatively describes the deformation of the tower 1 due to the lateral wind-strain W. By fixing the tower 1 in the guying point 12, the lateral deformation 32 of the tower 1 is reduced and the generators G1 to G3 arranged one above the other are only slightly deflected from their original position X1-X3 to X1'-X3'. This is possible despite the large overall height H, since the lateral shear forces F2 and F3 of the wind generators G2 and G3, due to the wind load W transmitted to the tower 1, cause opposite moments M due to the fixation of the tower 1 in the upper guying point 12 with the reacting force F12, that keeps the maximum deflection A of the tower tip from X3 to X3' low. The deflection A moves despite the high height in the range of thousandths of fractions of the height H of the entire tower 1. For example, a tower of 450 meters height and a slenderness of forty with full lateral wind load deflects only 50 centimeters. This very low deflection A is extremely advantageous for the even and safe operation of wind generators G at very high heights H. This fact contradicts the opinion of experts that stacked generators with very high overall heights could allegedly not be operated safely and economically in space wind farms. The tendon 14 leads into the base-area F of the neighboring tower and therefore only requires a guying foundation 6 (see FIGS. 1-4 and 6) or a split guying foundations 6' and 6" (see FIG. 1a) at the outer edges of the wind farm.

FIG. 5c illustrates once again the principle of the neutralization of opposing bending moments. The lateral forces F1-F3 caused by the wind W at the generators G1-G3 are transferred to the tower structure 1. Due to the support reaction at the anchoring point 12, a part F12 of the force is transferred to the tendon 14 and further parts, like forces F14 and F16 are transferred to the foundation 8 in the form of a support reaction at the base-area of the tower. The stressed tendon 14 transmits the applied force to a tower base-area F, or the base point 34, or to a foundation structure in the case of an offshore structure (not shown) of an adjacent tower structure or to an external foundation 6 (see FIG. 1b). In this way, all forces are safely transferred to the subsoil B. The forces are then transferred into the subsoil. The safety tendon 16 preferably transmits only insignificant parts of the occurring forces between two adjacent towers 1. The safety tendon 16 is intended mainly in the case when the tendon 14 should fail completely in order to hold the tower structure 1 affected by the failure in position and to avoid further damage. The graph in FIG. 5b shows the moment curve within the tower structure qualitatively in a schematic representation.

Figure 6:
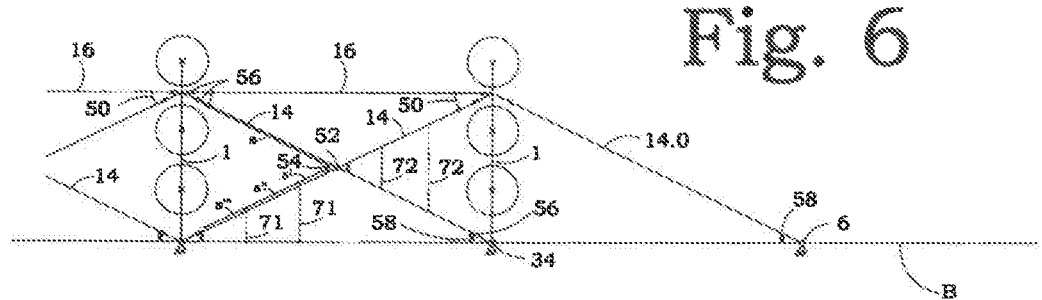

FIG. 6 schematically shows the principle of transferring loads and in particular vibrations in a side view. In particular, the vibrations of tendons 14 and safety tendons 16 can be reduced by active and/or passive damping elements in the direction of the tendon, symbolized by the spring symbols 56. In addition, active and/or passive damping elements 54 or 58 can also be mounted transversely to the course of the tendon. In the area of the intersection of the tendons 14, a link 52 is provided in order to avoid galloping and oscillations in the tendons 14. In addition, the tendons 14 and safety tendons 16, the towers 1 and the subsoil B can be connected by further connecting elements 71 and 72. The free oscillating length s of the tendon 14, for example, is thus divided into length segments s', s" and s'". This reduces the excitation sensitivity of the tendon 14. The safety elements 50 symbolically show, for example, safety lines, which can be additionally installed in order to prevent damage in the event of the failure of a tendon 14 or a safety tendon 16 by the rebounding of the tendon concerned.

Figure 7A:
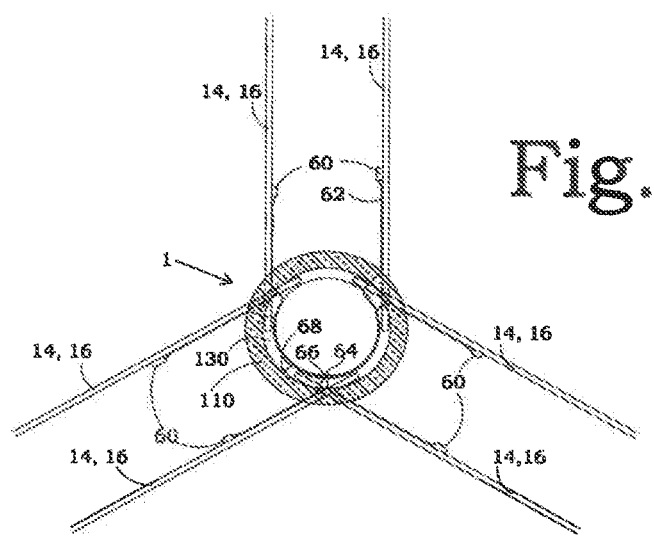

FIG. 7a shows in detail a schematic section through a tower 1, to which the tendons 14 and/or the safety tendons 16 are preferably tangentially fixed in a double-guided manner inside the tower structure 1. 110 describes the tower shell symbolically. 130 symbolically describes a cross-sectional widening of the tower shell inwards. Sensors 60 monitor the vibration behavior of the tendons. The schematic sensor 68 monitors the acceleration of the tower 1 in this section. All data are preferably sent collectively via data cables 62 and 64 and sent for further processing to higher-level processing units, the local and global controllers (not shown). Optionally, sensors with radio function can be used. FIG. 7a also shows that all tendons 14 and safety tendons 16 are preferably double-stranded for safety reasons.

Figure 7B:
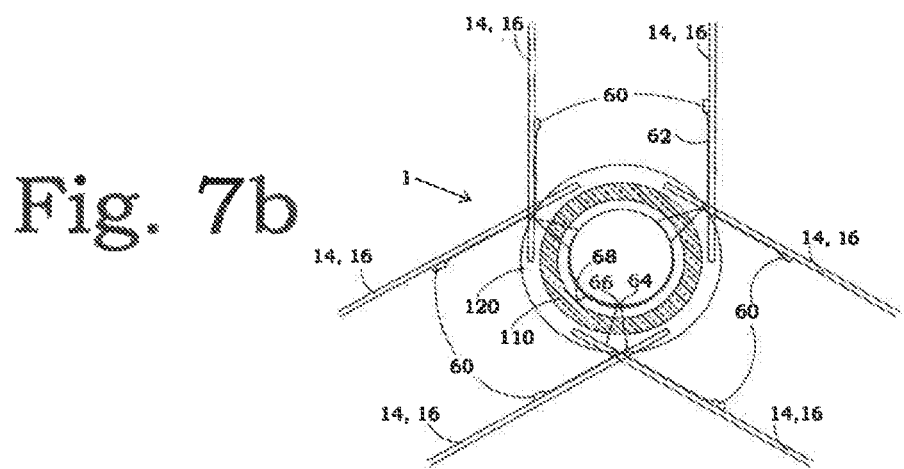

FIG. 7b shows the same situation of a schematic section through a tower 1, to which the tendons 14 and/or the safety tendons 16 are fastened, preferably double guided, tangentially outside the tower shell 110 of the tower 1. For this purpose, the tower 1 can have an expansion, e.g. In the form of a platform 120. According to the Invention, mixed forms from FIGS. 7a and 7b are possible.

Figure 8:
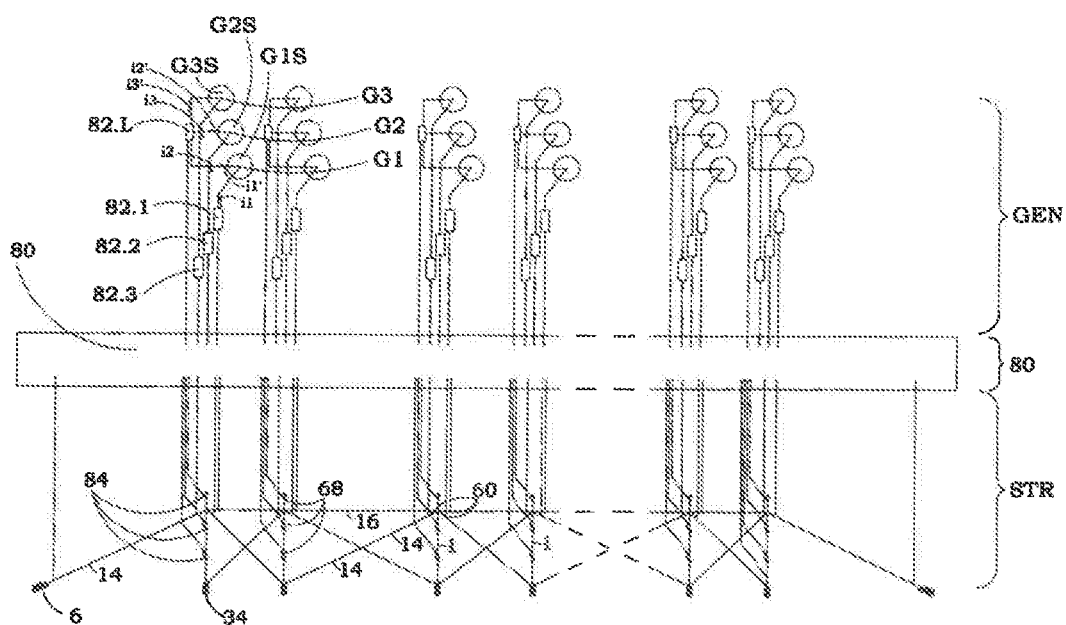

FIG. 8 shows schematically in a diagram the method of operation of the global controller 80. First, the sensors G1S, G2S, G3S, symbolically represented in the form of circles, transfer the status data i1, i2, i3 of the wind generators G1, G2, G3 (also only symbolically represented) of the respective wind generators G1, G2, G3 to the respective individual controllers 82.1, 82.2 and 82.3. Additionally and optionally the sensors transfer data i1', i2', i3' to a local controller 82.L. The individual controllers 82.1, 82.2 and 82.3 collect and process the incoming data i1, i2, i3 individually and thus control the wind generators G1, G2, G3 individually. The local controllers 82.L collect and process the incoming data i1', i2', i3' (and if necessary the data of further sensors of further wind generators) together and control the wind generators G1, G2, G3 (and if necessary further wind generators) together. Some or all of this data is also passed on to the global-controller 80. This data is summarized as the generator data GEN. The global-controller 80 also receives structural data STR from the structure and its components. Sensors 84, primarily acceleration sensors, monitor the behavior in the generator area and monitor the states of the tendons 14 and safety tendons 16 with additional sensors 60 and 68, also preferably acceleration sensors or tension sensors. 60 are symbolic acceleration and/or tension sensors of tendons 14 and 16, 68 are symbolic acceleration and/or tension sensors of towers 1, these data are also transmitted to the global-controller 80. The global-controller(s) 80 then continuously calculate the most favorable optimum operating condition from the GEN data and the STR data in a process in which, for example, certain generators operate at certain rotor speeds and other generators operate at other rotor speeds. In this way, the space wind farm is not only utilized as homogeneously as possible at all times via the control procedure of the global-controller(s) 80, but the global-controller(s) 80 also avoids resonances or load peaks due to unfavorable operating conditions with accumulating resonances and loads in the entire spatial structure. The latter is of great importance due to the invention, since the load-bearing elements act interconnected over the entire space wind park propagating vibrations in such a system through their connection and therefore require a method of continuous monitoring and adaptation of the entire system in order to suppress and avoid these vibrations and their propagation as far as possible in order to be able to operate as long-lived and low-wear as possible.

Not shown in FIG. 8 is that STR structural data can also be passed directly to local controllers 82.L or individual controllers 82.1, 82.2, 82.3.

Figure 9:
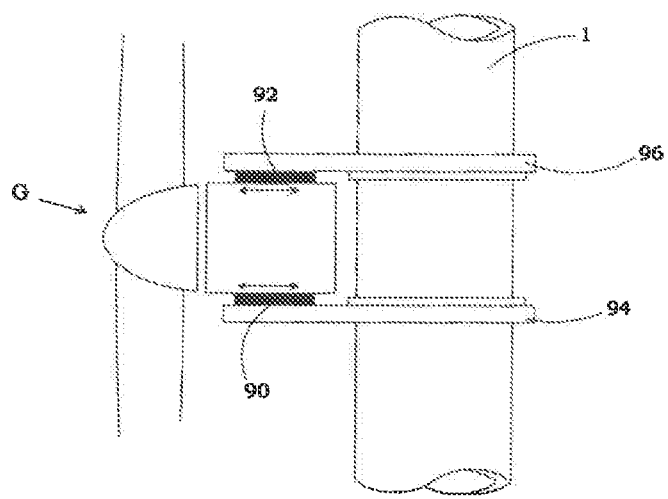

FIG. 9 schematically shows a possible arrangement of damping elements between generator G and tower 1 in order to decouple the vibrations of tower 1 and generator G from each other and to damp them. For this purpose, bearing elements 90 and 92 are preferably provided between the generator G and the connecting elements 94 and 96 to the tower structure. The invention says that the generator G can either rest on a connecting element 94, hang down from a connecting element 96 or be enclosed by connecting elements 94 and 96, also enclosed laterally, which, according to the invention, improves the transfer of forces from the generator G to the tower 1. The damping elements 90 and 92 as well as the connecting elements 94 and 96 can be freely combined. The connecting elements 94 and 96 can also be mounted or enclosed by the generator G. The damping elements 94 and 96 can also be mounted or enclosed by the generator G. The bearing elements 90 and 92, for example, can move like slides. The connecting element 94 is mounted so that it can rotate around the tower structure. The connecting element 96 is rotatable mounted around the tower structure. The damping elements 90 and 92 as well as the connecting elements 94 and 96 can be parts of the machine frame of the wind generator.

The invention claimed is:

1. A wind farm, comprising a plurality of tower structures which carry a plurality of wind generators arranged one above the other and which are laterally braced by tendons which lead laterally away from the tower structure, wherein the tendons, which run between the tower structures, are each held on the ground side in a base area of a neighboring tower structure.

2. The wind farm according to claim 1, wherein preferably three wind generators with their own associated wind blades are arranged one above the other.

3. The wind farm according to claim 1, wherein the tendons are fastened to the tower structure with one end in an upper region of the tower structure between a second uppermost wind generator and an uppermost wind generator.

4. The wind farm according to claim 1, wherein the tendons are fastened with one end in the tower foot region of the tower structure and wherein the tower foot region also contains a foundation structure for offshore construction methods.

5. The wind farm according to claim 1, wherein the tendons are fastened between a second uppermost wind generator and an uppermost wind generator to respectively adjacent tower structures.

6. The wind farm according to claim 1, wherein the tendons which run between two tower structures are double-stranded.

7. The wind farm according to claim 1, wherein damping elements are configured to be mounted either together or individually between the wind generator and the tower structure.

8. The wind farm according to claim 7, wherein connecting elements are configured to be mounted between the wind generator and the tower structure so that the wind generator is rotatably mounted around the tower structure.

9. The wind farm according to claim 7, wherein the connecting elements and the damping elements are part of a machine frame of the wind generator.

10. The wind farm according to claim 1, wherein a tower section above a region of an anchoring point of the tower is lighter in construction than a one below.

11. The wind farm according to claim 10, wherein the above tower section comprises a tubular steel tower.

12. The wind farm according to claim 1, wherein the tower structure has reinforcements in a tower wall in a region of a fastening device for engaging a lift.

13. The wind farm according to claim 1, wherein the tendons in an edge region of a wind park divide outer tendons into two diverging tendons and are fastened to the ground in anchoring foundations.

14. The wind farm according to claim 1, wherein the respectively adjacent wind generators on a tower structure rotate in opposite directions.

15. The wind farm according to claim 1, wherein the respectively adjacent wind generators are configured to rotate in opposite directions between two tower structures.

16. The wind farm according to claim 1, further comprising one or more global controllers configured to receive state data from said tower structures and tendons, via sensors and control an operating state of the wind generators correspondingly in a calculation method for avoiding load peaks and/or avoiding resonances.

17. The wind farm according to claim 16, wherein a local controller is configured to also process status data of the sensors from a near field of a building around the respective local controller.

18. A guyed tower structure in a wind form having a plurality of guyed tower structures having a plurality of wind generators as claimed in claim 1, arranged above each other which tower structures are laterally braced by tendons which lead laterally away from the guyed tower structure, wherein a global controller controls the wind generators in such a way that oscillations p and $3p$ of the individual wind generators excited by rotor blades are regulated in such a way by different rotational speeds of the individual wind generators, in that peak loads and unfavorable resonances between the individual wind generators are avoided at a same tower structure and at an adjacent tower structures to which they are connected via the tendons.

19. The guyed tower structure with several wind generators according to claim 18, wherein the global controller controls the wind generators in the wind farm in a method such that operating states differ from one another chaotically or quasi-chaotically.

20. The guyed tower structure having a plurality of wind generators in accordance with claim 18, wherein individual wind generators on a tower structure are configured to be individually rotated about a tower axis for maintenance purposes.

* * * * *